(12) United States Patent
Hauck et al.

(10) Patent No.: US 9,009,475 B2
(45) Date of Patent: Apr. 14, 2015

(54) APPARATUS AND METHODS FOR STORING ELECTRONIC ACCESS CLIENTS

(75) Inventors: Jerrold Von Hauck, Windermere, FL (US); David T. Haggerty, San Francisco, CA (US); Kevin McLaughlin, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/093,722

(22) Filed: Apr. 25, 2011

(65) Prior Publication Data

US 2012/0260090 A1 Oct. 11, 2012

Related U.S. Application Data

(60) Provisional application No. 61/472,109, filed on Apr. 5, 2011.

(51) Int. Cl.
| | |
|---|---|
| *G06F 21/00* | (2013.01) |
| *H04L 29/06* | (2006.01) |
| *H04W 12/06* | (2009.01) |
| *H04L 9/08* | (2006.01) |
| *H04L 9/30* | (2006.01) |
| *H04L 9/12* | (2006.01) |

(52) U.S. Cl.
CPC ........... *H04L 63/0853* (2013.01); *H04W 12/06* (2013.01); *H04L 9/08* (2013.01); *H04L 9/30* (2013.01); *H04L 9/12* (2013.01)

(58) Field of Classification Search
CPC ............... H04L 9/08; H04L 9/12; H04L 9/30; G06F 21/12; G06F 21/33; G06F 21/60; G06F 21/71

USPC ................. 370/338; 455/558, 556; 726/6, 22; 713/168

See application file for complete search history.

(56) References Cited

U.S. PATENT DOCUMENTS

| | | | |
|---|---|---|---|
| 6,372,974 B1 | 4/2002 | Gross et al. | |
| 8,146,141 B1 * | 3/2012 | Grandcolas et al. | 726/5 |

(Continued)

FOREIGN PATENT DOCUMENTS

| | | |
|---|---|---|
| EP | 2 076 071 A | 7/2009 |
| EP | 2076071 | 7/2009 |

(Continued)

OTHER PUBLICATIONS

Gavalas, Damianos; et al; "A hybrid centralised-distributed network management architecture"; Computers and Communications, 1999. Proceedings. IEEE International Symposium on DOI: 10.1109/ISCC.1999.780940; Publication Year: 1999, pp. 434-441.*

(Continued)

*Primary Examiner* — Harunur Rashid
*Assistant Examiner* — Angela Holmes
(74) *Attorney, Agent, or Firm* — Womble Carlyle Sandridge & Rice, LLP

(57) ABSTRACT

Apparatus and methods for storing and controlling access control clients. In one embodiment, transmitting and receiving devices ensure that only one copy of an eSIM is active at any time. Specifically, each transferred eSIM is encrypted for the destination device; the eSIM from the source device is deleted, deactivated, or otherwise rendered unusable. Various aspects of network infrastructure are also described, including electronic Universal Integrated Circuit Card (eUICC) appliances, and mobile devices. Various scenarios for transfer of eSIMs are also disclosed.

22 Claims, 5 Drawing Sheets

(56) References Cited

U.S. PATENT DOCUMENTS

| | | | |
|---|---|---|---|
| 2002/0114462 A1 | 8/2002 | Kudo et al. | |
| 2006/0072762 A1* | 4/2006 | Buer | 380/277 |
| 2006/0079284 A1* | 4/2006 | Lu et al. | 455/558 |
| 2007/0038576 A1 | 2/2007 | Lee | |
| 2007/0177562 A1* | 8/2007 | Castrogiovanni et al. | 370/338 |
| 2007/0180174 A1* | 8/2007 | Moosavi | 710/106 |
| 2008/0243683 A1 | 10/2008 | Patel et al. | |
| 2008/0253564 A1 | 10/2008 | Kahn et al. | |
| 2008/0261561 A1 | 10/2008 | Gehrmann | |
| 2008/0270307 A1 | 10/2008 | Olson et al. | |
| 2009/0070861 A1 | 3/2009 | Jain | |
| 2009/0125996 A1 | 5/2009 | Guccione et al. | |
| 2009/0205028 A1* | 8/2009 | Smeets et al. | 726/6 |
| 2009/0210923 A1 | 8/2009 | Jogand-Coulomb | |
| 2009/0290711 A1 | 11/2009 | Bloom et al. | |
| 2010/0242100 A1 | 9/2010 | Korhonen | |
| 2010/0262829 A1 | 10/2010 | Brown et al. | |
| 2010/0306107 A1 | 12/2010 | Nahari | |
| 2010/0310076 A1* | 12/2010 | Barzilai et al. | 380/278 |
| 2010/0311468 A1 | 12/2010 | Shi et al. | |
| 2011/0103589 A1* | 5/2011 | Tie et al. | 380/282 |
| 2011/0158411 A1* | 6/2011 | Medvinsky et al. | 380/279 |
| 2012/0108205 A1 | 5/2012 | Schell et al. | |
| 2012/0240238 A1* | 9/2012 | Gates et al. | 726/26 |
| 2012/0260090 A1 | 10/2012 | Hauck et al. | |

FOREIGN PATENT DOCUMENTS

| | | |
|---|---|---|
| EP | 2282442 | 2/2011 |
| EP | 2509352 | 10/2012 |
| JP | 2005-250567 | 9/2005 |
| JP | 2007-149184 | 6/2007 |
| JP | 2009545229 | 12/2009 |
| JP | 2010532107 | 9/2010 |
| WO | WO2005093989 | 10/2005 |
| WO | 2007129824 | 11/2007 |
| WO | WO2008013562 | 1/2008 |
| WO | WO2008018743 | 2/2008 |
| WO | WO2008128874 | 10/2008 |

OTHER PUBLICATIONS

Schroeder, M.D.; et al.; "Autonet: a high-speed, self-configuring local area network using point-to-point links"; Selected Areas in Communications, IEEE Journal on vol. 9 , Issue: 8; DOI: 10.1109/49.105178 Publication Year: 1991 , pp. 1318-1335.*

Australian Application No. 2012201945—Patent Examination Report dated Aug. 8, 2013.

European Application No. 12 163 464.6—Office Action dated Jul. 29, 2013.

Japanese Application No. 2012-098170—Office Action dated Jul. 24, 2013.

Korean Application No. 10-2012-35589—Preliminary Rejection dated Jul. 31, 2013.

Korean Patent Application No. 10-2012-35589—Office Action dated Apr. 14, 2014.

Taiwanese Patent Application No. 101111723—Office Action dated Mar. 20, 2014.

Japanese Patent Application No. 2012-098170—Office Action dated Jan. 8, 2014.

Kasper, M. "Virtualisation of a SIM-Card using Trusted Computing", Diploma Thesis, Apr. 30, 2007, XP055158722, pp. 1-100.

European Patent Application No. 14183033.1—Extended European Search Report dated Dec. 23, 2014.

* cited by examiner

APPARATUS AND METHODS FOR STORING ELECTRONIC ACCESS CLIENTS

PRIORITY AND RELATED APPLICATIONS

This application claims priority to U.S. Provisional Patent Application Ser. No. 61/472,109 filed Apr. 5, 2011 and entitled "APPARATUS AND METHODS FOR STORING ELECTRONIC ACCESS CLIENTS", the foregoing being incorporated herein by reference in its entirety.

This application is also related to co-owned, co-pending U.S. patent application Ser. Nos. 13/080,558 filed on Apr. 5, 2011, and entitled "APPARATUS AND METHODS FOR CONTROLLING DISTRIBUTION OF ELECTRONIC ACCESS CLIENTS", 12/952,082 filed on Nov. 22, 2010 and entitled "WIRELESS NETWORK AUTHENTICATION APPARATUS AND METHODS", 12/952,089 filed on Nov. 22, 2010 and entitled "APPARATUS AND METHODS FOR PROVISIONING SUBSCRIBER IDENTITY DATA IN A WIRELESS NETWORK", 12/980,232 filed on Dec. 28, 2010 and entitled "VIRTUAL SUBSCRIBER IDENTITY MODULE DISTRIBUTION SYSTEM", and 12/353,227 filed on Jan. 13, 2009, and entitled "POSTPONED CARRIER CONFIGURATION", and U.S. Provisional Patent Application Ser. Nos. 61/472,115 filed on Apr. 5, 2011, and entitled "APPARATUS AND METHODS FOR DISTRIBUTING AND STORING ELECTRONIC ACCESS CLIENTS", 61/407,858 filed on Oct. 28, 2010 and entitled "METHODS AND APPARATUS FOR ACCESS CONTROL CLIENT ASSISTED ROAMING", 61/407,861 filed on Oct. 28, 2010 and entitled "MANAGEMENT SYSTEMS FOR MULTIPLE ACCESS CONTROL ENTITIES" (now U.S. patent application Ser. No. 13/079,614 filed on Apr. 4, 2011, of the same title"), 61/407,862 filed on Oct. 28, 2010 and entitled "METHODS AND APPARATUS FOR DELIVERING ELECTRONIC IDENTIFICATION COMPONENTS OVER A WIRELESS NETWORK", 61/407,866 filed on Oct. 28, 2010 and entitled "METHODS AND APPARATUS FOR STORAGE AND EXECUTION OF ACCESS CONTROL CLIENTS" (now U.S. patent application Ser. No. 13/080,521 filed on Apr. 5, 2011, of the same title), 61/408,504 filed on Oct. 29, 2010 and entitled "ACCESS DATA PROVISIONING SERVICE" (now U.S. patent application Ser. No. 13/078,811 filed on Apr. 1, 2011, and entitled "ACCESS DATA PROVISIONING APPARATUS AND METHODS"), 61/409,891 filed on Nov. 3, 2010 and entitled "METHODS AND APPARATUS FOR ACCESS DATA RECOVERY FROM A MALFUNCTIONING DEVICE", 61/410,298 filed on Nov. 4, 2010 and entitled "SIMULACRUM OF PHYSICAL SECURITY DEVICE AND METHODS" (now U.S. patent application Ser. No. 13/080, 533 filed on Apr. 5, 2011, of the same title), and 61/413,317 filed on Nov. 12, 2010 and entitled "APPARATUS AND METHODS FOR RECORDATION OF DEVICE HISTORY ACROSS MULTIPLE SOFTWARE EMULATION", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of communications systems, and more particularly in one exemplary aspect to storing and distributing access control clients to devices.

2. Description of Related Technology

Access control is required for secure communication in most prior art wireless radio communication systems. As an example, one simple access control scheme might comprise: (i) verifying the identity of a communicating party, and (ii) granting a level of access commensurate with the verified identity. Within the context of an exemplary cellular system (e.g., Universal Mobile Telecommunications System (UMTS)), access control is governed by an access control client, referred to as a Universal Subscriber Identity Module (USIM) executing on a physical Universal Integrated Circuit Card (UICC). The USIM access control client authenticates the subscriber to the UMTS cellular network. After successful authentication, the subscriber is allowed access to the cellular network. As used hereinafter, the term "access control client" refers generally to a logical entity, either embodied within hardware or software, suited for controlling access of a first device to a network. Common examples of access control clients include the aforementioned USIM, CDMA Subscriber Identification Modules (CAM), IP Multimedia Services Identity Module (ISIM), Subscriber Identity Modules (SIM), Removable User Identity Modules (RUIM), etc.

Traditionally; the USIM (or more generally "SIM") performs the well known Authentication and Key Agreement (AKA) procedure, which verifies and decrypts the applicable data and programs to ensure secure initialization. Specifically, the USIM must both. (i) successfully answer a remote challenge to prove its identity to the network operator, and (ii) issue a challenge to verify the identity of the network.

While traditional SIM solutions are embodied within a removable Integrated Circuit Card (ICC) (also referred to as a "SIM card"), incipient research by the Assignee hereof is directed to virtualizing SIM operation within a software client executing within the mobile device. Virtualized SIM operation can reduce device size, increase device functionality, and provide greater flexibility.

Unfortunately, virtualized SIM operation also presents multiple new challenges for network operators and device manufacturers. For example, traditional SIM cards are manufactured and guaranteed by a trusted SIM vendor. These traditional SIM cards execute a single secure version of software that has been permanently "burned" to the SIM card. Once burned, the card cannot be tampered with (without also destroying the SIM card).

In contrast, mobile devices are manufactured by a wide range of device manufacturers, and may execute software provided by multiple or even unknown third party software vendors. Additionally, mobile devices are frequently "patched" with software, which can both fix existing bugs, and introduce new ones. Any software is susceptible to corruption, sabotage, and/or misuse. Moreover, while physical SIM cards are very difficult to replicate, software can be readily copied, multiplied, etc. Since each SIM represents a contracted for amount of access to finite network resources, illicit use of a virtualized SIM can greatly impact network operation and user experience.

Accordingly, new solutions are needed for providing protections and properties for virtualized SIMs that are generally analogous to those of traditional "hard" SIMs. More generally, improved solutions are needed for storing and distributing virtualized access control clients. Ideally, such solutions should provide the benefits of traditional access control client operation, with the added capabilities of virtualized operation.

SUMMARY OF THE INVENTION

The present invention addresses the foregoing needs by providing, inter alia, apparatus and methods for storing and distributing access control clients to devices.

In one aspect of the present invention, an apparatus for storing one or more access data elements is disclosed. In one embodiment, the secure apparatus includes a secure element adapted to store a plurality of user access data elements, each user access data element encrypted for the secure element. The secure apparatus further includes a processor, and a storage device in data communication with the processor, the storage device including computer-executable instructions that are configured to, when executed by the processor: receive a request for one or more access data elements from a peer device; verify the peer device; decrypt the one or more requested access data elements; re-encrypt the decrypted one or more access data elements for the peer device; and transfer the one or more re-encrypted data elements to the verified peer device, the transfer causing removal of the one or more access data elements from the secure element.

In one variant, the user access data element is an electronic Subscriber Identity Module (eSIM).

In a second variant, the verification includes checking a certificate associated with the peer device, and generating a challenge response.

In a third variant, the computer-executable instructions, additionally include instructions that are configured to, when executed by the processor, negotiate a transfer protocol. In one example, the re-encryption of the decrypted one or more access data elements is based at least in part on the transfer protocol. In another example, the transfer protocol includes one or more elements of handshaking. In yet another such example, the negotiated transfer protocol includes identification of a transfer protocol supported by the apparatus and the peer device.

In a fourth variant, the apparatus includes a Hardware Security Module (HSM).

In a fifth variant, the apparatus is embodied within a mobile phone.

In yet a sixth variant, the apparatus is embodied within a physical card form factor.

In another embodiment, the apparatus includes a secure element adapted to store a plurality of user access data elements, each user access data element encrypted for the secure element. The apparatus further includes a processor, and a storage device in data communication with the processor, the storage device including computer-executable instructions that are configured to, when executed by the processor: request one or more access data elements from a verified peer device; receive the one or more requested access data elements from the verified peer device; verify the one or more requested access data elements are encrypted for the secure element; store the one or more encrypted access data elements within the secure element; and decrypt the one or more encrypted access data elements during an authentication protocol.

In one variant, the user access data element is an electronic Subscriber Identity Module (eSIM).

In a second variant, the apparatus is embodied within a mobile phone.

In a third variant, the apparatus is embodied within a physical card form factor, for use within a mobile phone.

In a fourth variant, the verification includes checking a digital certificate issued by a trusted certification authority.

In a fifth variant, the verification includes completion of a challenge and response cryptographic exchange.

In a sixth variant, the peer device includes a SIM Provisioning Service (SPS).

In a seventh variant, the peer device includes a eUICC appliance.

In an eighth variant, the peer device includes desktop computer in operative communication with a mobile applications store.

In a third aspect of the present invention, a method for transferring one or more access data elements is disclosed. In one embodiment, the one or more access data elements having a unique identifier associated therewith, and the method includes: agreeing to a transfer protocol between a device and a peer device; receiving the one or more access data elements from the peer device; verifying the transferred one or more access data elements, the one or more access data elements and unique identifier being encrypted for the device; and storing the transferred one or more access data elements.

In a first variant, the user access data element includes an electronic Subscriber Identity Module (eSIM).

In a second variant, the unique identifier of the transferred one or more access data elements is determined by the device.

In a third variant, the unique identifier of the transferred one or more access data elements is provided to the peer device.

In a fourth variant, the method additionally includes notifying the peer device of successful receipt of the one or more access data elements.

In a fifth variant, the unique identifier of the transferred one or more access data elements is provided to the peer device.

In a fourth aspect of the invention, a computer readable apparatus is disclosed. In one embodiment, the apparatus includes a storage medium with at least one computer program disposed thereon which is configured to, when executed: transfer one or more access data elements by at least: agreeing to a transfer protocol with a peer device; and receiving the one or more access data elements from the peer device.

Further features of the present invention, its nature and various advantages will be more apparent from the accompanying drawings and the following detailed description.

Figure 1:
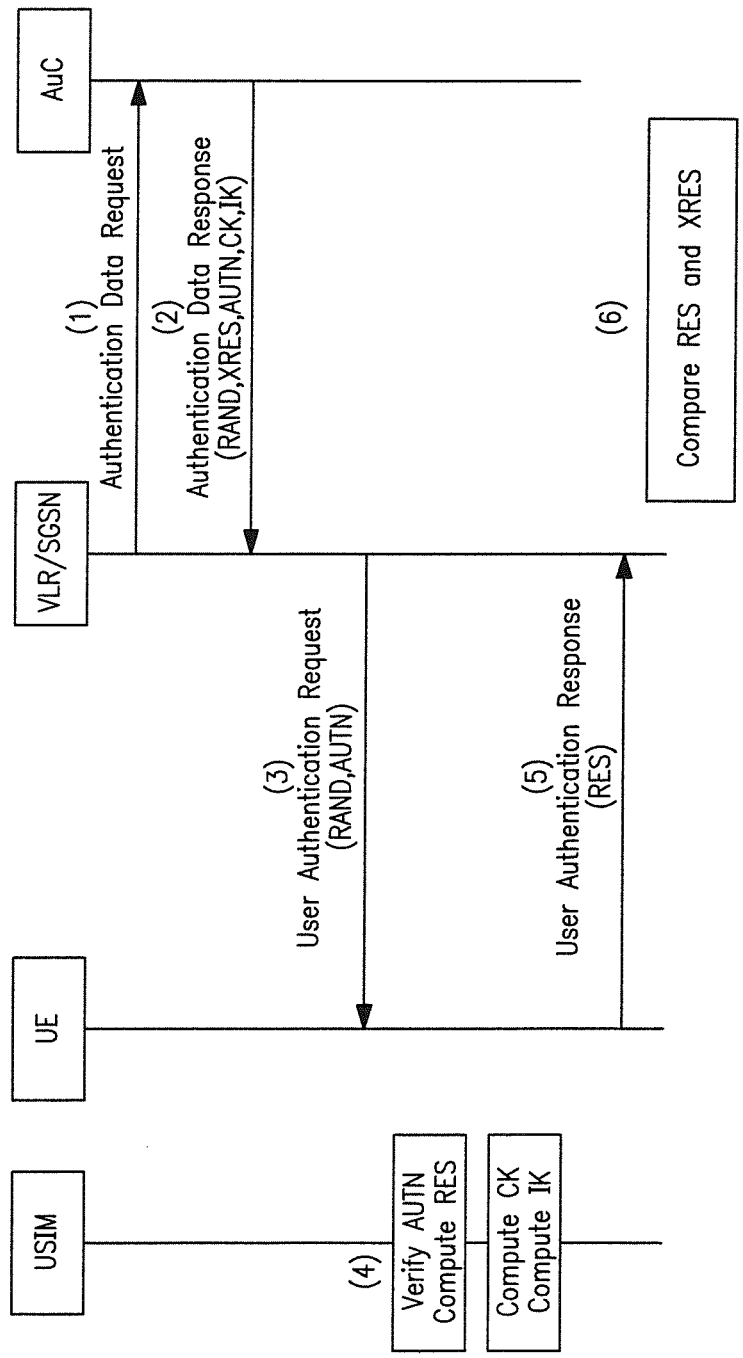
FIG. 1 graphically illustrates one exemplary Authentication and Key Agreement (AKA) procedure using a prior art USIM.

All Figures © Copyright 2011 Apple Inc. All rights reserved.

DETAILED DESCRIPTION OF THE INVENTION

Reference is now made to the drawings wherein like numbers refer to like parts throughout Overview The present invention provides, inter alia, methods and apparatus for storing and distributing access control clients to devices such as for example mobile devices or "smart-phones". In a first aspect of the invention, devices used for transferring access control clients (e.g., eSIMs) enforce uniqueness and conservation of the clients by ensuring that the transfer is only performed with a trusted device. In one embodiment, a eUICC appliance is disclosed, which is implemented within a Hardware Security Module (HSM). Each HSM can store a large number of eSIMs to facilitate storage and distribution thereof, such as for retail services. The described eUICC appliances first verify that their peer eUICC appliances are operating according to an agreed upon and trusted protocol. If both eUICC appliances are in agreement, then, when the source eUICC appliance transfers its eSIM, it will delete its eSIM (or otherwise render its own eSIM inactive). The destination eUICC appliance will retain the only active eSIM.

In a second aspect of the invention, when an access control client is moved from one device to another, the receiving device issues a challenge or unique identifier. In one embodiment, the sending device encrypts the access control client using the receiving device's public key and adds a unique identifier or challenge, the combination of the encrypted access control client and unique identifier or challenge is further signed. After transmission, the sending device deletes its access control client. The receiving device verifies the encrypted access control client, and the unique identifier; if valid, then the encrypted access control client and unique identifier are stored for future use.

In the exemplary configuration, access control clients are only transferred between devices that conform to a standard trusted relationship. In this manner, since both devices are operating according to an agreed upon protocol, the access control client can remain unique and conserved throughout transfer. Furthermore, by ensuring that the access control client is encrypted only for the destination device and deleted from the current device, intervening malicious parties cannot subvert or defeat the transfer process.

Various other scenarios for transfer of access control clients are also described in greater detail herein.

Detailed Description of Exemplary Embodiments

Exemplary embodiments and aspects of the present invention are now described in detail. While these embodiments and aspects are primarily discussed in the context of Subscriber Identity Modules (SIMs) of a GSM, GPRS/EDGE, or UMTS cellular network, it will be recognized by those of ordinary skill that the present invention is not so limited. In fact, the various aspects of the invention are useful in any network (whether wireless cellular or otherwise) that can benefit from storing and distributing access control clients to devices.

It will also be recognized that while the term "subscriber identity module" is used herein (e.g., eSIM), this term in no way necessarily connotes or requires either (i) use by a subscriber per se (i.e., the invention may be practiced by a subscriber or non-subscriber); (ii) identity of a single individual (i.e., the invention may be practiced on behalf of a group of individuals such as a family, or intangible or fictitious entity such as an enterprise); or (iii) any tangible "module" equipment or hardware.

Prior Art Subscriber Identity Module (SIM) Operation—

Within the context of the exemplary prior art UMTS cellular network, user equipment (UE) includes a mobile device and a Universal Subscriber Identity Module (USIM). The USIM is a logical software entity that is stored and executed from a physical Universal Integrated Circuit Card (UICC). A variety of information is stored in the USIM such as subscriber information, as well as the keys and algorithms used for authentication with the network operator in order to obtain wireless network services. In one embodiment, USIM software is based on the Java Card™ programming language. Java Card is a subset of the Java™ programming language that has been modified for embedded "card" type devices (such as the aforementioned UICC). Other implementations may include so-called "native" software implementations, and/or implementations which are proprietary, etc.

Generally, UICCs are programmed with a USIM prior to subscriber distribution; the pre-programming or "personalization" is specific to each network operator. For example, before deployment, the USIM is associated with an International Mobile Subscriber Identify (IMSI), a unique Integrated Circuit Card Identifier (ICC-ID) and a specific authentication key (K). The network operator stores the association in a registry contained within the network's Authentication Center (AuC). After personalization the UICC can be distributed to subscribers. Referring now to FIG. 1, one exemplary Authentication and Key Agreement (AKA) procedure using the aforementioned prior art USIM is illustrated in detail. During normal authentication procedures, the UE acquires the International Mobile Subscriber Identify (IMSI) from the USIM. The UE passes the IMSI to the Serving Network (SN) of the network operator or the visited core network. The SN forwards the authentication request to the AuC of the Home Network (HN). The HN compares the received IMSI with the AuC's registry and obtains the appropriate K. The HN generates a random number (RAND) and signs it with K using an algorithm to create the expected response (XRES). The HN further generates a Cipher Key (CK) and an Integrity Key (IK) for use in cipher and integrity protection as well as an Authentication Token (AUTN) using various algorithms. The HN sends an authentication vector, consisting of the RAND, XRES, CK, and AUTN to the SN. The SN stores the authentication vector only for use in a one-time authentication process. The SN passes the RAND and AUTN to the UE.

Once the UE receives the RAND and AUTN, the USIM verifies if the received AUTN is valid. If so, the UE uses the received RAND to compute its own response (RES) using the stored K and the same algorithm that generated the XRES. The UE passes the RES back to the SN. The SN compares the XRES to the received RES and if they match, the SN authorizes the UE to use the operator's wireless network services.

The foregoing procedure of FIG. 1 is embodied within the physical media of the SIM card. Prior art SIM cards have at least two (2) distinct and desirable properties: (i) SIM cards provide cryptographically secured storage for SIM data (e.g., account information, encryption keys, etc.), and (ii) SIM cards cannot be easily cloned.

A prior art SIM card includes a processor and memory formed in a Universal Integrated Circuit Card (UICC). The SIM card may be filled with epoxy resin to prevent external probing of data signals on the UICC. Other tamper-proof structures may be included in the UICC if desired (e.g., shielding layers, masking layers, etc.) The SIM card has a secure interface to the processor, and the processor has an internal interface to the memory. The UICC receives power from the external device, which enables the processor to execute code from the memory component. The memory component itself is not directly accessible (i.e., internal filesystems are hidden from the user), and must be accessed via the processor.

During normal operation, the processor accepts a limited number of commands. Each of the commands is only conditionally accessible. Access conditions are constrained to the execution of commands to prevent unauthorized access. Access conditions may or may not be hierarchical e.g., authorization for one level may not automatically grant authorization for another level. For example, one set of access conditions may include: (i) always accessible, (ii) never accessible, (iii) accessible to a first account, (iv) accessible to a second account, etc. Conditional access is granted only after successful completion of an appropriate security protocol. Common methods for verifying identity may include a password or Personal Identification Number (PIN), challenge of a shared secret, etc.

Conditional access, limited command set, and protected memory space, ensure that the information stored within the SIM card is secure from external access. Cloning a SIM card would entail construction of a physical card, and construction of the internal filesystem and data. The combination of these features renders the physical SIM card impervious to practical forgery attempts.

Electronic Subscriber Identity Module (eSIM) Operation—

As a brief aside, the terms "conservation", "conserve" and "conserved", as used herein refer to an element (either physical or virtual), that cannot be trivially multiplied or diminished. For example, a conserved eSIM cannot be copied or replicated during normal operation.

Additionally, as used herein, the terms "uniqueness" as applied to an element (either physical or virtual), refers to the property whereby the element is the one and only element having a particular property and/or characteristic. For instance, a unique eSIM cannot have a duplicate eSIM.

As used herein, the term "security" generally refers to protection of the data and/or software. For example, access control data security ensures that the data and/or software associated with an access control client is protected from theft, misuse, corruption, publication and/or tampering, by unauthorized activities, and/or malicious third parties.

Moreover, as used herein, the term "user authorization" generally refers to specifying a user's access to resources. As a brief aside, with prior art physical SIM cards, user authorization is enforced with physical SIM card possession; the physical card represents the user's authorization to access network resources. For example, when a physical SIM card is moved from a first phone to a second phone, it is assumed that the move was performed by the user (and implicitly authorized by the user). Within the context of eSIM operation, analogous capabilities are needed for user authorization of eSIM transfers. In particular, the "owner" of the eSIM (and also the network) needs assurances that the eSIM is only transferred to legitimate devices.

Generally, it is appreciated that software is more flexible than hardware; for example, software is easy to copy, modify, and distribute. Additionally, software can often be made cheaper, more power efficient, and physically smaller than hardware equivalents. Accordingly, while conventional SIM operation makes use of physical form factors such as cards (UICCs), current areas of research are focused toward virtualizing SIM operation within software. However, the sensitive nature of SIM data (e.g., subscriber specific information, etc.) requires special consideration. For example, various portions of SIM data are unique to subscribers, and should be carefully guarded from malicious third parties. Moreover, as previously stated, each SIM represents a contracted for amount of access to finite network resources; thus, duplication, destruction, and/or reclamation of SIMs must be managed to prevent over and/or under utilization of network resources, as well as subrogation of service provider fees or revenue. Accordingly, virtualized SIMs should satisfy the following properties: (i) security, (ii) uniqueness, and (iii) conservation. Moreover, such properties should ideally be afforded at a cost comparable to existing network infrastructures.

Incipient solutions for SIM operation emulate an UICC as a virtual or electronic entity such as e.g., a software application, hereafter referred to as an Electronic Universal Integrated Circuit Card (eUICC). The eUICC is capable of storing and managing one or more SIM elements, referred hereafter as Electronic Subscriber Identity Modules (eSIM). However, solutions for virtualized eSIM operation must provide equivalent (if not improved) security to existing security capabilities already provided by prior art UICCs. Additionally, the existing infrastructure requires suitable methods for enforcing conservation of virtualized eSIMs, such that the number of virtualized eSIMs is controlled throughout the network (i.e., virtualized eSIMs are not duplicated, lost, etc.).

Figure 2:
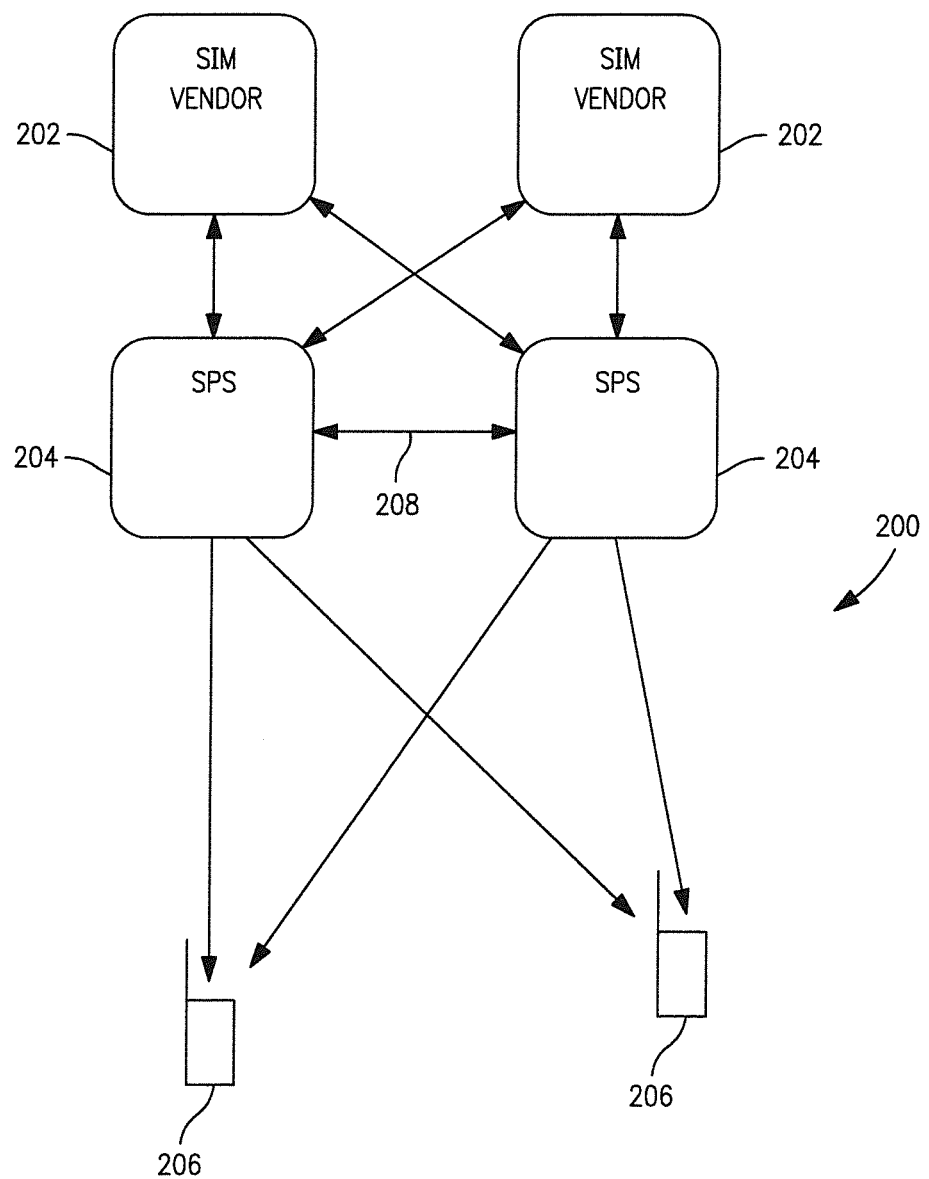
FIG. 2 is a block diagram of one exemplary network architecture useful for distributing access control clients.

Consider the system illustrated in FIG. 2; the system 200 includes: (i) a number of SIM vendors 202, (ii) a number of SIM provisioning servers (SPSs) 204 (such as those described in greater detail in co-owned and co-pending U.S. patent application Ser. Nos. 12/952,082 filed on Nov. 22, 2010 and entitled "WIRELESS NETWORK AUTHENTICATION APPARATUS AND METHODS", and 12/952,089 filed on Nov. 22, 2010 and entitled "APPARATUS AND METHODS FOR PROVISIONING SUBSCRIBER IDENTITY DATA IN A WIRELESS NETWORK", previously incorporated by reference), and (iii) a population of user equipment (UE) 206, where each UE contains a secure eUICC. The following discussions describe different schemes for distributing eSIMs from the SIM vendor to the secure eUICC.

In a first scheme, the UE 206 requests an eSIM from any SPS 204, and the SPS retrieves an appropriate eSIM from a trusted entity such as the SIM vendor 202 (or in other cases a Mobile Network Operator (MNO), Trusted Services Manager (TSM), etc.). In this approach, the SIM vendor can easily control the distribution of eSIMs; each newly requested eSIM is granted only by the SIM vendor. However, since the SIM vendor is the only party that can dispense eSIMs, the SIM vendor can create "bottlenecks" if a large population of subscribers flood the SIM vendor with requests within a short period of time (as is common for successful product releases). Similarly, the SIM vendor is a single point of failure. Consequently, in the event of a disaster, eSIM issuance would be completely halted.

In a second scheme, each SPS 204 retrieves a pool of eSIMs from the SIM vendor 202, and stores the pool of eSIMs within each SPS (the pool of eSIMs is duplicated for each SPS). Thereafter, the SPS distributes the eSIMs to UEs 206 on request. The eSIM can only be decrypted and used by the secure eUICC. This distributed SPS server model is not bottlenecked by the SIM vendor. However, this second scheme requires substantially more infrastructure. Specifically, the population of SPSs must ensure that no duplicated eSIMs are distributed. Accordingly, whenever an SPS grants an eSIM, the other SPSs must be notified to deactivate their duplicate eSIMs via communication link 208. This ensures that the eSIMs are unique (i.e., no duplicate eSIMs have been distributed). The communication to retain eSIM state information synchronization between the SPSs is a significant amount of traffic on network infrastructure. Moreover, slow network connections or network disruption can further cause "race conditions". Within the context of computer networking, race conditions generally refer to data hazards resulting from propagation delay between network entity synchronization. For example, imperfect synchronization can cause two (2) SPSs to export the same eSIM at the same time (creating a race condition); this will result in the eSIM being accidentally cloned.

In yet a third scheme (not shown), the SPS 204 and SIM vendor 202 infrastructures are combined in some fashion. For example, the SIM vendor and SPS network may be housed together in a common facility and freely access one another, or are otherwise logistically intertwined. Successful operation of intertwined facilities requires a trusted business relationship between the SIM vendor and the SPS network operator, which may be undesirable (e.g., where business concerns conflict, due to legal anti-trust considerations, etc.)

Each of the foregoing schemes requires significant communications overhead to synchronize the various network entities during transfer. For example, when an eSIM is successfully transferred from an SPS to a mobile device, each SPS must be notified that the eSIM cannot be transferred again (to prevent multiple deliveries of the same eSIM e.g., as described supra).

Method—

Accordingly, various aspects of the present invention advantageously enable virtualized access control client operation and distribution which provide equivalent and/or improved capabilities to prior art solutions (e.g., physical card based access control clients). In one exemplary embodiment, a self contained SIM provisioning service (SPS) entity can operate in conjunction with other peer SPS devices, enabling distributed peer models for SIM provisioning (as opposed to a centralized model which tracks eSIMs from a centralized database, or distributed schemes which require synchronization between peer devices). Moreover, as described in greater detail herein, embodiments of the present invention are not specific to any particular network infrastructure, and can flexibly accommodate virtually any configuration.

In one aspect of the invention, an access control client can be stored and transferred only to one secure element at a time. In one embodiment, the secure element only stores access control clients received from other secure elements which have the same or comparable protocols (described in greater detail subsequently herein). Similarly, the secure element limits the transfer of access control clients to other secure elements which have the same or comparable protocols. For example, the secure elements may limit transactions to other secure elements that meet certain security requirements. Some Mobile Network Operators (MNO) may enforce higher security with their devices, than other MNOs. In various embodiments, secure elements could be certified at different levels and the access control clients can require a certain certification level. During the transfer process, the device removes (or renders inactive) its own access control client. By ensuring that both the clients involved in the transfer are trusted entities and honor the same protocol, access control clients are not multiplied or diminished in transfer.

As a brief aside, a secure element may be embodied as a processor or processing apparatus executing software from a protected storage medium. In some variants, the protected storage medium is encrypted so as to preclude unauthorized access or tampering. Moreover, the secure element may be physically hardened or protected to prevent access to the storage medium and/or secure processor. Common examples of physical hardening may include a physical case or other mechanism primed to self destruct or render the device inaccessible in the event of unauthorized access attempts, and/or embedding circuits in a resin or other material to prevent external probing.

In some embodiments, the secure element of the present invention is configured to further limit and/or monitor/flag aberrant access. For example, in one embodiment, transfer or storage of an access control client to the secure element requires a challenge response and/or unique identifier. An improper challenge response or an incorrect identifier may indicate aberrant/fraudulent activity. Similarly, transactions between secure elements are encrypted; thus improperly encrypted transactions may also flag suspicious behavior.

Figure 3:
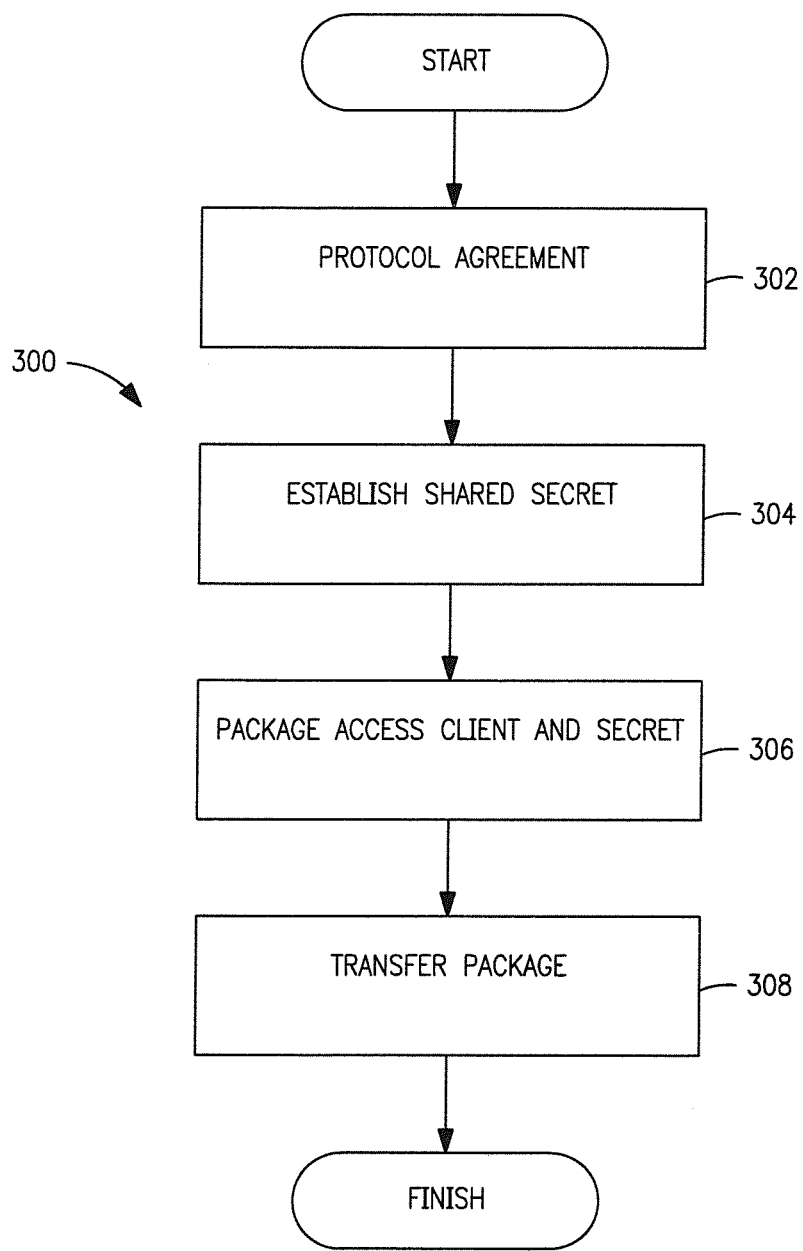
FIG. 3 is a logical flow diagram illustrating one embodiment of a generalized method for transferring access control clients to devices according to the present invention.

Referring now to FIG. 3, one embodiment of a generalized method 300 for storing and transferring access control clients according to the invention is shown. In one implementation, at least one device is a eUICC appliance that is embodied within a Hardware Security Module (HSM) that can manage the storage of one or more eSIMs. In some embodiments, the HSM stores the encrypted eSIM locally, or alternately, encrypts the eSIM for storage on remote media (in some cases, insecure filesystems). In an alternate implementation, at least one device is a eUICC appliance that is embodied within a physical SIM card form factor (e.g., enabling legacy form factor receptacle reuse). In still another alternate, at least one device is a hardened device, such as a mobile phone including a eUICC appliance embodied within a secure element (i.e., the secure element cannot be removed from the device without destroying or otherwise compromising the integrity of the device).

At step 302 of the method 300, the source device and destination device agree on a protocol. In one embodiment, the protocol type is based on a version of software identified e.g., in plain text. In other embodiments, the protocol type is inherent to an otherwise ciphered initial communication. For example, an encrypted 256-bit challenge may inherently specify a particular protocol or set of protocols, whereas an unencrypted challenge may inherently specify a different protocol. In still other embodiments, the protocol may be based upon a discovery process. For example, in some variants, devices may be registered with a directory service, where a registry includes information such as identifier, network address, supported protocol types, etc.

In one exemplary embodiment, the protocol type is determined by a signed certificate issued by a mutually trusted issuer authority. A digital certificate may include, but is not limited to, for example: (i) a serial number (to uniquely identify the certificate), (ii) the device being certified, (iii) the signature algorithm used to create the signature, (iv) the issuer that verified the information and signed the certificate, (v) a validity range (e.g., valid from, valid until, etc.), (vi) an encryption key, and/or (vii) a thumbprint or verification hash (to verify the legitimacy of the certificate). Digital certificates are well known in the related arts, and will not be further described.

In one such variant, the mutually trusted issuer authority is an activation authority e.g., the Mobile Network Operator (MNO) authentication center (AuC). In other variants, the mutually trusted issuer authority is a trusted third party e.g., a SIM vendor, the device manufacturer, etc. The mutually trusted issuer authority need not be the same for both devices. For example, in some embodiments, a system may have multiple trusted entities (e.g., multiple accepted MNOs, multiple trusted device manufacturers, etc.). Moreover, in certain systems, a trusted entity can be a root of trust for another unknown entity (e.g., the trusted entity provides assurance that the unknown entity can also be trusted). Such trust "chains" can be extended across an arbitrary number of intermediate devices; each intermediate device is chained to the trust level of its predecessor, which extends to the trusted root entity.

In other examples, eUICC appliances may support any appliance device that is compliant to a standardized specification, etc. Similarly, to ensure backward compatibility, future incarnations of a eUICC appliance may also support legacy eUICC appliances, etc.

The available devices and/or accepted protocols for available devices may be stored for example within a lookup directory service. Such directory service type applications are common within the network infrastructure arts. For instance, multiple arrays of appliances can be further matched with a directory service server configured to provide connection information for each of the appliances. A requester party (either source or destination) can request information from the directory service.

In some embodiments, the protocols are codified according to a software version or revision. For example, the devices may verify that the other device is of an acceptable software version or revision. Alternately, the source and destination devices may agree to an informal protocol; for example, the devices may be required to negotiate or determine a protocol dynamically. In yet other embodiments, no protocol negotiation is necessary (i.e., systems which only support a single transfer protocol).

The transfer protocol may specify, inter alia, types of challenge response protocols, unique identifier selection, transfer encryption, access control client management (e.g., deletion procedures, acknowledgement procedures, etc.) during transfer. As previously indicated, in order to ensure that conservation and uniqueness properties of an access control client are retained during transfer, the access control client is encrypted for the destination device, and deleted from the transferring device. For example, the transfer protocol may specify: (i) if acknowledgement of reception is required, (ii) if retransmission is allowed when transmission fails, (iii) an acceptable number of retry attempts, and/or (iv) under what conditions the source device can delete the encrypted access control client.

It will be appreciated that the source device may delete and/or deactivate the encrypted access control client at different times and/or under different conditions, as may be convenient or required under the various scenarios. In some embodiments, deletion may occur some time after transfer. Such embodiments may be of particular use in bulk transfers. Alternately, the access control client may be deactivated some time before transfer. Similarly, in other embodiments, a "validity window" may also be specified for transfer, such that a particular transfer must be accomplished within a prescribed temporal window to be considered valid.

Other considerations include, inter alia, device considerations, and/or access control client considerations. For example, some devices may only be allowed to receive (or transmit) an access control client. In one such implementation, a mobile device may be limited to only receive an eSIM (once assigned, it cannot be returned, etc.) Alternately, certain devices may be used only as a "one-time" transfer (e.g., a disposable device for providing an eSIM once). In some cases, a device may be more (or less) secure than the peer device. For example, in one exemplary embodiment, user equipment may have more rigid security requirements than a eUICC appliance; the eUICC appliance may be protected via other measures (e.g., secure infrastructure, etc.). Secure user equipment can also transfer an eSIM to a less secure eUICC appliance, provided the less secure eUICC appliance implements a minimum level of security. Similarly, in some cases, access control clients have transfer limitations, including but not limited to: (i) a total number of transfers allowed, (ii) destination device restrictions, etc.

Moreover, it is appreciated that communication method may have significant impact on transfer protocol considerations. Network infrastructure transfers may use high bandwidth protocols and media (e.g., T3, T1, Sonet (Synchronous Optical Networking), Gigabit Ethernet, etc.), whereas consumer-based transfers may be performed over lower bandwidth connections (e.g., cellular access, WLAN (Wireless Local Area Network), Ethernet, etc.). Different use scenarios may also have different requirements for handshaking, transfer time requirements, etc. For example, a SIM vendor may transfer a large number of eSIMs to a eUICC appliance (e.g., such as to facilitate SIM delivery or other functions). Similarly, in another example, a centralized large repository of eSIMs can be freely transferred among a number of eUICC appliances. The eUICC appliances can freely transfer eSIMs from appliance to appliance, to facilitate load management, etc. Handshaking requirements for these bulk transfer scenarios are less important, as the eSIMs are not in circulation (acknowledgements can be lumped together at the end of the transfer, rather than for each individual eSIM).

Customer applications can have much slower transfer rates, but handshaking is more important, as the eSIM should be robustly delivered, and immediately available for use. In some variants, failure to complete the handshaking process will automatically trigger a retry attempt. For example, a eUICC appliance, SIM Provisioning Server (SPS), or similar entity may directly transfer an eSIM to service an impromptu eSIM request from user equipment (UE), or an application executing from a desktop or portable computer. In another such example, customer-based applications may execute a small internalized appliance capable of storing one or more eSIMs (e.g., one for work, one for personal use, several for roaming access, etc.) enabling a customer to transfer an eSIM among their various devices.

At step 304 of the method 300 of FIG. 3, the source and destination devices establish a shared secret. In one exemplary embodiment, the devices verify the peer device identity by inspecting a digital signature, and if the signature is valid, exchanges (or agrees to exchange) a challenge, unique identifier, or other security token for encryption with the access control client.

For example, the devices may utilize a challenge and response type handshake; where any trusted device knows a common secret (e.g., a common key, a set of keys, etc.), which can be used to generate a number of challenges and associated responses. Devices can trust an unknown device, provided they can generate proper challenges, and/or appropriate responses.

In another example, the devices may utilize a unique identifier that is generated by the destination device with the access control client request. The source device includes the unique identifier with the access control client to identify the serviced request.

In yet other embodiments, the devices may verify their peer device with a trusted third party (e.g., the trusted third party provides each of the devices a session key). Such relationships can be verified directly or indirectly. For example, the peer devices may directly query a trusted third party before executing the transfer, or alternately each device may present a certificate signed by trusted third parties, etc.

Yet other types of cryptographic arrangements and trust scenarios will be recognized for use with the invention by those of ordinary skill given the present disclosure.

At step 306, the source device packages the access control client with the secret (e.g., challenge, unique identifier, or other security token). In one exemplary embodiment, the package is additionally encrypted using the destination device's public key. In one variant, the source device must first decrypt the access control client with its own private key, prior to re-encrypting the access control client.

Once encrypted with the destination device's public key, only the destination device can decrypt the access control client for use. One example of a public and private key encryption for transferring access control clients is described in U.S. Provisional Patent Application No. 61/407,866 filed on Oct. 28, 2010 and entitled "METHODS AND APPARATUS FOR STORAGE AND EXECUTION OF ACCESS CONTROL CLIENTS" previously incorporated herein. For example, each eUICC appliance has a unique device public/private key pair and endorsement certificate. The public/private key pair is based on a secret private key, and a publishable public key. Public/private key schemes are considered "asymmetric", as the key used to encrypt and decrypt are different, and thus the encrypter and decrypter do not share the same key.

It is further acknowledged that steps 306 and 304 (among others) may be further combined, subdivided, and/or reversed. For example, in one embodiment, the source device determines a session key, and encrypts the access control client with the session key, the resulting package being further wrapped with the destination device's public key. In one such variant, the session key is determined by the destination device at the time of receipt.

Additionally, in some embodiments, the packages are further digitally signed to provide further verification of the source device. The destination device can check the digital signature, to verify that the package (e.g., the access control client and unique identifier, etc.) originated from the source device. Moreover, it is widely appreciated that digital signatures are merely a subset of electronic signatures, consequently other forms of source verification can similarly be employed including but not limited to: user identification (password, biometrics, etc.), electronic identification, etc.

At step 308, the packaged access control client is transferred from the source to the destination device. The destination device verifies the shared secret, and if the verification is successful, stores the encrypted access control client for future use. In one embodiment, the access control client is deleted, deactivated, or otherwise rendered unusable, at the source device prior to enabling the access control client for the destination device (e.g., prior to transfer, prior to completing transfer, prior to acknowledging transfer success, etc.).

Example Operation—

As one example of typical operation according to the invention, during initialization, the SIM vendors provide a collection or "lot" of eSIMs to the eUICC appliances. Note that multiple SIM vendors (and) can independently provide eSIMs; there is no required collaboration on the part of the SIM vendors (although such collaboration may also be used if desired). The SIM vendors further encrypt each of the eSIMs with a challenge or unique identifier for the eUICC appliances.

As previously described, each eSIM includes a virtualized SIM and the unique key associations and capabilities to execute the aforementioned Authentication and Key Agreement (AKA) scheme for authenticating a mobile device to the cellular network (see discussion of Prior Art Subscriber Identity Module (SIM) Operation supra). Additionally, each eSIM is uniquely associated with a challenge or identifier that changes on a per-transfer basis. A typical implementation of a challenge or identifier may include a cryptographic material, counter, pseudo-random sequence, large state machine, etc.

Consider the following operation—a first eUICC appliance initiates an eSIM transfer (which is currently encrypted for the first eUICC appliance) to a second eUICC appliance. The first eUICC appliance initiates a secure communication to the second eUICC appliance. In one scenario, both the first and second eUICC appliances agree to the transfer based on certificates signed by one or more mutually trusted third parties. The second eUICC appliance provides a unique identifier to the first eUICC appliance. The first eUICC appliance decrypts the eSIM with its own private key, and then re-encrypts the eSIM with the second eUICC's public key (the public key is freely distributed by the second eUICC). The combination of the unique identifier and the re-encrypted eSIM are signed by the first eUICC appliance (the signature verifies the first eUICC appliance's identity). The signed combination is packaged for the second eUICC. Now, only the second eUICC can decrypt the eSIM, and the signed combination proves that the encrypted eSIM package corresponds to the unique identifier. The first eUICC appliance transmits the newly encrypted eSIM to the second eUICC appliance.

In one embodiment, the unique identifier is used to protect against replay attacks. For example, each eSIM transfer is uniquely identified, thus the transaction cannot be "copied" and played back (e.g., by a malicious third party). For example, when transferring an eSIM from appliance A to appliance B, and then from appliance B to appliance C, the transfer between appliance A to appliance B cannot be replayed while the eSIM is still at appliance C.

Similarly, consider the transfer of an eSIM from the first eUICC appliance to a mobile device. The mobile device issues a request for an eSIM with a challenge, and its public key. The first eUICC appliance decrypts an eSIM with its own private key, and generates a proper challenge response. The eSIM is re-encrypted with the mobile device's public key. The re-encrypted eSIM is combined with a challenge response, and then signed. The mobile device verifies the challenge response (which identifies the first eUICC appliance as a legitimate source), and if successful decrypts the eSIM for use. Even if a malicious third party could intercept the encrypted eSIM, it would not be able to use or tamper with the eSIM (since the eSIM is encrypted).

Finally, consider the transfer of an eSIM from the first mobile device to the second mobile device. The first mobile device pushes a request to transfer its eSIM to the second mobile device. In one scenario, the user of either the first or second mobile device must manually accept the transfer. If accepted, the second mobile device transmits a challenge to the first mobile device. The first mobile device decrypts its stored encrypted eSIM with its own private key, then re-encrypts the eSIM with the second mobile device's public key (the second mobile device's public key is always available), including the proper response. The combination is signed, and transmitted. The second mobile device verifies the challenge response (which identifies the first mobile device as a legitimate source), and decrypts the eSIM for use.

Apparatus—

Various apparatus useful in conjunction with the above described methods are now described in greater detail.

eUICC Appliance—

Figure 4:
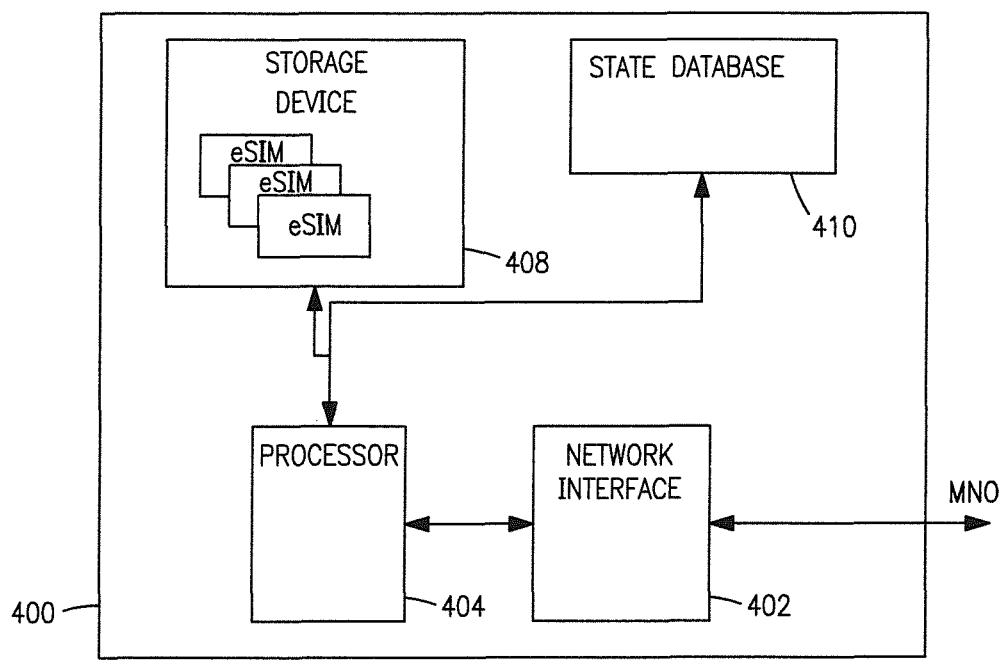
FIG. 4 is a block diagram illustrating one embodiment of a eUICC appliance adapted to store one or more access control clients, in accordance with the present invention.

FIG. 4 illustrates one exemplary embodiment of a eUICC appliance 400 in accordance with the present invention. The eUICC appliance may comprise a stand-alone entity, or be incorporated with other network entities (e.g., a Service Provisioning Service (SPS), etc.). As shown, the eUICC appliance 400 generally includes a network interface 402 for interfacing with the communications network, a processor 404, and a storage apparatus 408. The network interface is shown connecting to the WINO infrastructure, so as to provide access to other eUICC appliances, and direct or indirect access to one or more mobile devices, although other configurations and functionalities may be substituted.

In one configuration, the eUICC appliance is a Hardware Security Module (HSM). A HSM includes one or more secure elements for managing a number of access control clients. In some embodiments, the access control clients are stored directly at the HSM. Alternatively, the access control clients are encrypted and stored in external storage. In such external (e.g., remote) storage embodiments, the encryption ensures that the access control clients are secure, even when stored on physically unsecure media.

The HSM is configured to enable transfer of access control clients to and from another HSM, while preserving the uniqueness and conservation of the access control clients. Moreover, transfer of the access control clients to another HSM in this embodiment causes a deactivation and/or deletion of the locally stored access control clients. An HSM can also be configured to self-destruct or disable itself if tampered with.

In the illustrated embodiment of FIG. 4, the eUICC appliance 400 includes at least a SIM database 410 running on the processor 404. Although illustrated as a single application running on the eUICC appliance, it is appreciated that the foregoing database functionality may comprise a distributed application running on a plurality of devices in data communication with one another.

The SIM database application processes requests that include: (i) a request to store an eSIM, (ii) a request to transfer a currently stored eSIM. The database application is also responsible for verifying requests to ensure that communication is received from an entity authorized to make such a request (see step 304, discussed supra).

In one embodiment, the SIM database application is configured to execute a challenge and response security protocol. The challenge/response security protocol is configured to verify requests made by an unknown third party, based on appropriate generation of challenges and/or responses. Alternately, in another embodiment, the secure element can verify a digital certificate signed by a trusted authority.

As shown, the storage apparatus 408 is adapted to store an array of access control clients. In one embodiment, a eUICC appliance stores an array of eSIMs. In one such implementation, each eSIM includes a small file system that includes computer readable instructions (the eSIM program) and associated data (e.g., cipher keys, integrity keys, etc.). In addition, each eSIM is additionally encrypted with the eUICC appliance's public key. Accordingly, each eUICC can only be decrypted by the eUICC appliance. In some embodiments, each encrypted eSIM is further encrypted with a unique identifier, challenge, or challenge response. In some embodiments, the encrypted components is further stored as a Binary Large Object (BLOB).

The SIM database application is configured to manage the available eSIMs. As illustrated in FIG. 4, the database may provide information relating to the particular eSIM BLOB, the devices authorized to use the eSIM, the current state and/or the current status of the eSIM ("available", "not available", "stale", etc.). Additional information may be maintained as well. The database application is configured to update or change information stored in the database.

When another device requests an eSIM from the eUICC appliance 400, the database application retrieves the current state of the requested eSIM. This information can be used to determine if the requested eSIM can be provided. This validity check can be performed at an activation service, at the eUICC appliance, be shared, or occur at yet other locations; e.g., by comparing the state at the activation service versus the last known state at the eUICC appliance. Similarly, when another device transfers an eSIM to the eUICC appliance 400, the database application is responsible for updating the current state of the transferred eSIM.

User Apparatus—

Figure 5:
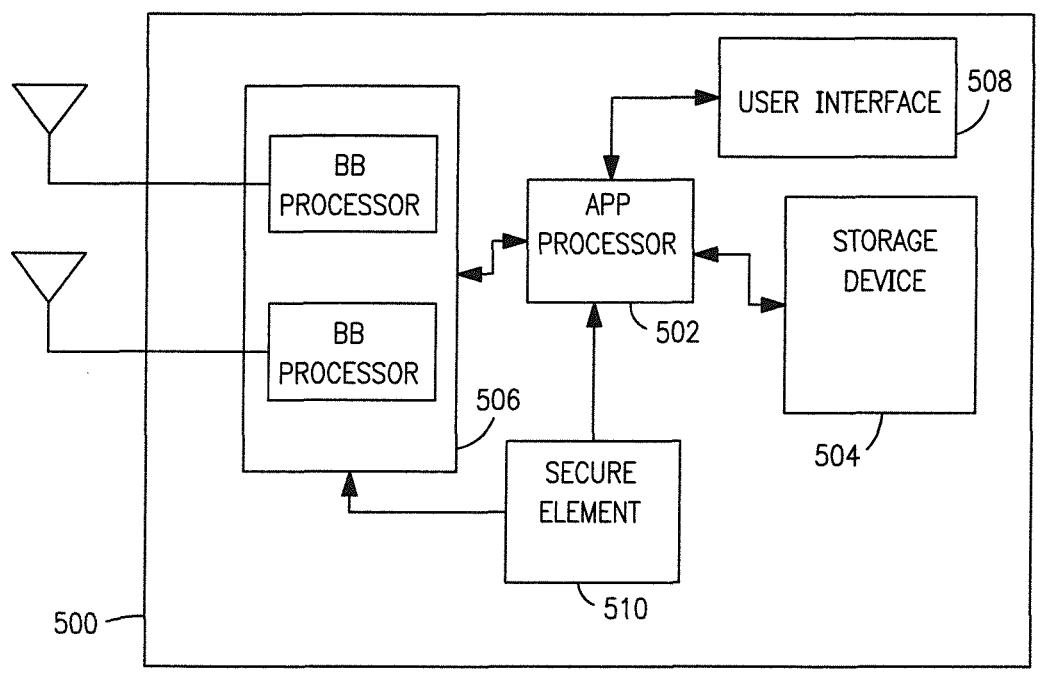
FIG. 5 is a block diagram illustrating one embodiment of a mobile device adapted to store and use one or more access control clients, in accordance with the present invention.

Referring now to FIG. 5, exemplary user apparatus 500 (e.g., a UE) in accordance with various aspects of the present invention is illustrated.

The exemplary UE apparatus of FIG. 5 is a wireless device with a processor subsystem 502 such as a digital signal processor, microprocessor, field-programmable gate array, or plurality of processing components mounted on one or more substrates. The processing subsystem may also comprise an internal cache memory. The processing subsystem is in communication with a memory subsystem 504 including memory which may for example, comprise SRAM, flash, and/or SDRAM components. The memory subsystem may implement one or a more of DMA type hardware, so as to facilitate data accesses as is well known in the art. The memory subsystem contains computer-executable instructions which are executable by the processor subsystem.

In one exemplary embodiment, the device can comprise of one or more wireless interfaces 506 adapted to connect to one or more wireless networks. The multiple wireless interfaces may support different radio technologies such as GSM, CDMA, UMTS, LTE/LTE-A, WiMAX, WLAN, Bluetooth, etc. by implementing the appropriate antenna and modem subsystems.

The user interface subsystem 508 includes any number of well-known I/O including, without limitation: a keypad, touch screen (e.g., multi-touch interface), LCD display, backlight, speaker, and/or microphone. However, it is recognized that in certain applications, one or more of these components may be obviated. For example, PCMCIA card-type client embodiments may lack a user interface (as they could piggyback onto the user interface of the host device to which they are physically and/or electrically coupled).

In the illustrated embodiment, the device includes a secure element 510 which contains and operates the eUICC application. The eUICC is capable of storing and accessing a plurality of access control clients to be used for authentication with a network operator. The secure element includes in this embodiment a secure processor executing software stored in a secure media. The secure media is inaccessible to all other components (other than the secure processor). Moreover, the secure element may be further hardened to prevent tampering (e.g., encased in resin) as previously described.

The secure element 510 is capable of receiving and storing one or more access control clients. In one embodiment, the secure element stores an array or plurality of eSIMs associated with a user (e.g., one for work, one for personal, several for roaming access, etc.), and/or according to another logical scheme or relationship (e.g., one for each of multiple members of a family or business entity, one for each of personal and work use for the members of the family, and so forth). Each eSIM includes a small file system including computer readable instructions (the eSIM program), and associated data (e.g., cipher keys, integrity keys, etc.)

The secure element is further adapted to enable transfer of eSIMs to and/or from the mobile device. In one exemplary embodiment, the mobile device provides a GUI-based acknowledgement to initiate transfer of an eSIM.

Furthermore, various realizations of the exemplary embodiment include instructions which when executed, launch a challenge/response security protocol. The challenge response security protocol is configured to verify requests made by an unknown third party, based on appropriate generation of challenges and/or responses. Alternately, in one exemplary embodiment, the secure element can verify a digital certificate signed by a trusted authority.

Moreover, in one embodiment, the secure element maintains a listing or manifest of stored access control clients. The manifest may include information as to the current status of the stored access control clients; such information may include for example availability, completeness, validity, and/or prior experienced errors. The manifest may be further linked or coupled to the user interface, so as to enable user selection of an available access control client.

In one exemplary embodiment, the secure element has associated device cryptographic keys. These device keys are used to secure exchanges of access control clients. In one such variant, the cryptographic keys are an asymmetric public/private key pair. The public key can be freely distributed without compromising the integrity of the private keys. For example, the device may be assigned (or internally generate) an RSA public/private key; the public key is made available for post deployment communication.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will, be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. An apparatus configured to provide access data elements to peer devices, the apparatus comprising:
    a first secure element adapted to store a plurality of access data elements; and
    a processor configured to cause the apparatus to:
        receive, from a peer device, a request for at least one access data element of the plurality of access data elements, wherein the request includes:
            a public key that is unique to a second secure element included in the peer device, and
            a unique identifier that is generated by the peer device in conjunction with the request;
        obtain, from the first secure element, the at least one access data element;
        encrypt the at least one access data element using the public key;
        generate a package that includes the encrypted at least one access data element and the unique identifier;
        sign the package to produce a signed package, wherein the signed package enables the peer device to authenticate the apparatus;
        transfer the signed package to the peer device; and
        in response to receiving, from the peer device, an indication that the at least one access data element is stored in the second secure element:
            remove the at least one access data element from the first secure element.

2. The apparatus of claim 1, wherein each access data element of the plurality of access data elements is associated with a mobile network operator (MNO).

3. The apparatus of claim 1, wherein each access data element of the plurality of access data elements is associated with a user.

4. The apparatus of claim 1, wherein each access data element of the plurality of access data elements is associated with a different use case for a same user.

5. The apparatus of claim 1, wherein the processor is further configured to cause the apparatus to negotiate a transfer protocol with the peer device prior to receiving the request from the peer device.

6. The apparatus of claim 5, wherein the processor is further configured to cause the apparatus to encrypt the signed package based on the negotiated transfer protocol.

7. The apparatus of claim 6, wherein negotiating the transfer protocol comprises identifying that the transfer protocol is supported by the apparatus and the peer device.

8. The apparatus of claim 1, wherein the processor is further configured to cause the apparatus to identify a number of times the at least one access data element has been transferred between different devices.

9. The apparatus of claim 8, wherein the processor is further configured to cause the apparatus to transfer the signed package to the peer device subsequent to verifying that the number of times satisfies a predetermined threshold.

10. The apparatus of claim 1, wherein each access data element of the plurality of access data elements is an electronic Subscriber Identity Module (eSIM).

11. The apparatus of claim 1, wherein the apparatus is a Hardware Security Module (HSM).

12. A method for transferring access data elements to peer devices, the method comprising:
    at an apparatus including a first secure element that stores a plurality of access data elements:
        receiving, from a peer device, a request for at least one access data element of the plurality of access data elements, wherein the request includes:
            a public key that is unique to a second secure element included in the peer device, and
            a unique identifier that is generated by the peer device in conjunction with the request;
        obtaining, from the first secure element, the at least one access data element;
        encrypting the at least one access data element using the public key;
        generating a package that includes the encrypted at least one access data element and the unique identifier;
        signing the package to produce a signed package, wherein the signed package enables the peer device to authenticate the apparatus;

transferring the signed package to the peer device; and in response to receiving, from the peer device, an indication that the at least one access data element is stored in the second secure element:

removing the at least one access data element from the first secure element.

13. The method of claim 12, wherein each access data element of the plurality of access data elements is associated with a mobile network operator (MNO).

14. The method of claim 12, further comprising negotiating a transfer protocol with the peer device prior to receiving the request from the peer device.

15. The method of claim 12, further comprising identifying a number of times the at least one access data element has been transferred between different devices.

16. The method of claim 15, wherein the signed package is transferred upon verifying that the number of times satisfies a predetermined threshold.

17. The method of claim 12, further comprising identifying device restrictions associated with the peer device.

18. The method of claim 17, wherein the signed package is transferred to the peer device subsequent to verifying that the device restrictions do not prohibit the transfer of the signed package.

19. The method of claim 12, wherein each access data element of the plurality of access data elements is an electronic Subscriber Identity Module (eSIM).

20. A mobile device, comprising:
a secure element; and
a processor configured to cause the mobile device to:
issue, to an apparatus configured to store a plurality of access data elements, a request for at least one access data element of the plurality of access data elements, wherein the request includes:
a public key that is unique to the secure element, and
a unique identifier that is generated in conjunction with issuing the request;
receive a package from the apparatus, wherein the package includes:
a digital signature generated by the apparatus;
the at least one access data element, wherein the at least one access data element is encrypted based on the public key, and the unique identifier;
verify the package in accordance with the digital signature;
decrypt the at least one access data element using a private key that corresponds to the public key; and
store the at least one access data element into the secure element.

21. The mobile device of claim 20, wherein the package is received from the apparatus subsequent to the apparatus verifying that the at least one access data element has been transferred a number of times that satisfies a particular threshold.

22. The mobile device of claim 20, wherein each access data element of the plurality of access data elements is an electronic Subscriber Identity Module (eSIM).

* * * * *